United States Patent
Bauer

[11] 3,995,824
[45] Dec. 7, 1976

[54] DEVICE FOR REMOVABLY MOUNTING OF A LENGTHWISE-ADJUSTABLE COLUMN TO A CHAIR SEAT, TABLE TOP, OR THE LIKE

[75] Inventor: Fritz Bauer, Altdorf, Brd, Germany
[73] Assignee: Verin AG, Berneck, Switzerland
[22] Filed: May 20, 1975
[21] Appl. No.: 579,134

[30] Foreign Application Priority Data
June 14, 1974  Germany .......................... 2428776

[52] U.S. Cl. ................................ 248/400; 403/370
[51] Int. Cl.² ...................................... A45D 19/04
[58] Field of Search .......... 248/161, 162, 400, 404, 248/188.1; 403/314, 367–371, 409

[56] References Cited
UNITED STATES PATENTS

| | | | |
|---|---|---|---|
| 175,695 | 4/1876 | Guss | 403/314 |
| 179,936 | 7/1876 | McGill et al. | 403/369 |
| 844,385 | 2/1907 | Mommertz | 403/368 X |
| 1,785,171 | 12/1930 | Adams et al. | 403/370 X |
| 2,849,886 | 9/1958 | McCloskey | 403/370 X |
| 3,279,870 | 10/1966 | Janiszewski | 403/370 X |
| 3,574,365 | 4/1971 | Bailey et al. | 403/370 X |
| 3,711,054 | 1/1973 | Bauer | 248/400 |
| 3,711,054 | 1/1973 | Bauer | 248/161 X |

FOREIGN PATENTS OR APPLICATIONS

| | | | |
|---|---|---|---|
| 216,544 | 7/1958 | Australia | 403/370 |
| 1,399,694 | 5/1965 | France | 403/370 |
| 1,913,801 | 8/1970 | Germany | 248/161 |

*Primary Examiner*—Lawrence J. Staab
*Attorney, Agent, or Firm*—Browdy and Neimark

[57] ABSTRACT

A device for releasably attaching a gas spring to the bottom of a chair comprises a cup shaped holding device having a tapered surface, a tapered gripping device and a bolt or the like for wedging the gripping device in the holding device against the gas spring.

5 Claims, 8 Drawing Figures

DEVICE FOR REMOVABLY MOUNTING OF A LENGTHWISE-ADJUSTABLE COLUMN TO A CHAIR SEAT, TABLE TOP, OR THE LIKE

FIELD OF INVENTION

The invention relates to a device for removable mounting of a lengthwise-adjustable cylindrical column, particularly a lengthwise adjustable gas spring, to a seat bottom of a chair, with a holding element fastenable against the underside of the seat bottom, such element being provided with a recess to accept the upper end of the column and a clamping device for clamping the column in place in the recess.

BACKGROUND OF THE INVENTION

A device of this type is disclosed by German Auslegeschrift No. 1,931,012. In this device, the holding element is provided with a slotted annular clamp having approximately radially projecting flanges in the vicinity of the slot. The lengthwise adjustable gas spring serving as a column, whose use as a chair column, table column, or the like, is there described in detail and which is hereby incorporated by reference, is inserted from below into the recess of the clamp. Then the clamp is tensioned to clamp the column in place by a tensioning screw that squeezes together the two flanges, and therefore the clamp, firmly against the outer circumference of the gas spring.

A device of this kind is extraordinarily simple and very reliable as long as the holding element can be made of steel, i.e., a material with some elasticity; hence, in order to replace the gas spring that serves as a column, it is necessary as a rule to bend the gas spring in order to pull it out after the tensioning screw has been loosened. If the holding element has a more complicated shape, because for example it must accept additional parts for a tipping device for a seat bottom, this holding element can no longer be made economically from steel, but must be made of die-cast or injection-molded metal, which has the disadvantage of being very inelastic and brittle. If in such cases the clamp should be bent, being made in one piece with the holding element, it would break.

In addition, it is known from German Utility Model No. 7,019,918 that the gas spring which serves as a column can be made conical in its upper area and the recess in the holding element can likewise be made conical. The connection between the gas spring and the holding element is then simply effected by pressing the holding element tightly against the gas spring. The clamping forces on the cone then suffice to keep it in place. This type of releasable fastening has the disadvantage, however, that slight differences in the diameter of the cone can lead to considerable differences in length when sliding it into the recess in the holding element and, under certain conditions, can cause problems with the actuation of the release rod of the gas spring. In addition, these conical connections are extraordinarily sensitive to tolerances and for these reasons are relatively costly to manufacture.

Furthermore, it is known that gas springs can be attached by means of a threaded connection to holding element fastenable to the seat bottom. In practice it has been found that if the two threaded parts are not applied with the correct torque, the connection will loosen, leading to wobbling of the seat bottom and consequent damage to the column, i.e. the gas spring.

SUMMARY OF THE INVENTION

Hence, an object of the invention is to obviate the deficiencies of the prior art, such as indicated above.

It is another object to provide for improved connecting means between a holding element and a column.

It is another object to make a device of the type described hereinabove such that, even when brittle materials are used for the holding element, a simple, reliable, easily releasable connection is effected between the holding element and the column, whereby the axial position of the column relative to the holding element can simultaneously be determined accurately.

This problem is solved according to the present invention by providing, in the vicinity of the recess, at least one gripping device which has a gripping surface resting against a part of the column, such gripping device having a guiding surface opposite the gripping surface supported on a corresponding slightly sloping guide surface in the holding element opposite the central lengthwise axis of the column, and by the gripping device being displaceable by means of a tensioning device in the holding element roughly parallel to the central lengthwise axis of the column. By using this design, the advantages of known clamping devices can be combined with the advantages of a conical connection without the corresponding disadvantages. Since no deformation of the holding element is required to loosen and remove the gas spring, there is no danger of breakage if this element is made of die-cast or injection molded metal. In addition, the gas spring need not be provided with a cone, but can be made cylindrical, in the simplest manner from the manufacturing standpoint.

In other areas of technology, so-called clamp plate connections are known, but they are used in those instances to solve completely different problems.

In the present exemplification of the invention, the tensioning device is formed in a particularly simple fashion by at least one threaded bolt which passes through the gripping device to mesh with a corresponding thread in the holding element. When this threaded bolt is screwed into the thread in the holding element, the gripping device is displaced both in the direction of the threaded bolt and simultaneously vertically thereto, due to the lateral displacement by the guide surfaces, and perpendicularly thereto, being pressed laterally against the gas spring, which rests against the wall located opposite the recess in the holding element.

In order to allow a simple releasing of the gripping device, in other words in order to achieve entrainment of the gripping device when unscrewing the threaded bolt, the gripping device is advantageously largely protected against displacement in the direction of the threaded bolt with a retaining ring being provided on the threaded bolt in the simplest manner.

Furthermore, in the present exemplification of the invention, it is possible to ensure in a particularly simple manner that a stop collar is provided in the recess to guide the column axially, so that the column reaches a precisely defined position with respect to the holding element.

In a further advantageous embodiment of the invention, the tensioning device consists of at least one threaded bolt which is held in place with respect to the mounting element and fits into a threaded recess in the gripping device.

Furthermore, it may be advantageous for the tensioning device to consist of a clamping plate which is axially tensionable against the column and rests against the gripping device.

A particularly simple tightening and loosening of the gripping device is then possible when the tensioning device consists of a wedge which is mounted slightly tangentially to the column and passes through the gripping device and holding element; such wedge merely requires to be knocked in or out with a hammer.

An especially uniform tensioning of the column will be achieved when the gripping device is made in the form of a truncated cone surrounding the column. If one or more overlapping gripping devices are provided, which cover only a small sector of the column, it is particularly advantageous to mount each gripping device in a recess radially disposed with respect to the recess that accepts the column. In this case it is also advantageous to have the part of the wall of the holding element which delimits the recess for the gripping device laterally, to merge tangentially with the part of the wall which delimits the column recess. This prevents shearing and bending forces in the parts of the wall, in other words, only tensile forces develop when the gripping device or devices are tightened; this is particularly advantageous from the strength standpoint.

The device of the invention also makes it possible and particularly advantageous to ensure that the holding element and a plate which can be fastened to the seat bottom can be made in one piece. Furthermore, the holding element can be designed in a particularly simple manner as a deep-drawn part.

Finally, it is advantageous for particularly good centering of the gripping device or devices if the guiding surfaces for the gripping device or devices in the holding element are bent in the cross-sectional plane of the column.

BRIEF DESCRIPTION OF THE DRAWING

Further advantages and features of the invention will follow from the description of sample embodiments with reference to the drawings, wherein.

DETAILED DESCRIPTION OF EMBODIMENTS

Figure 1:
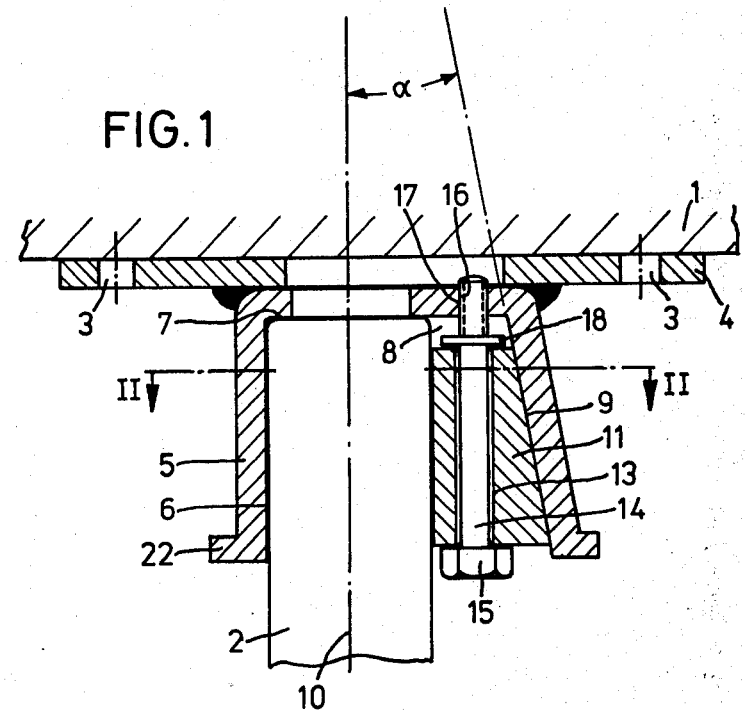
FIG. 1 is a vertical lengthwise cross section through a device according to the invention.

A device for connecting a seat bottom 1 of an article of a chair or the like such as an armchair, stool or swivel chair, with a lengthwise-adjustable chair column, comprising a cylindrical lengthwise-displaceable gas spring 2, has a connecting plate 4 which can be screwed to the underside of the seat bottom 1 through holes 3, the underside of the plate 4 having a cup-shaped holding element 5. The holding element 5 can be attached to the flange-like connecting plate 4 by welding or screwing or it can be made in one piece with the latter.

Figure 2:
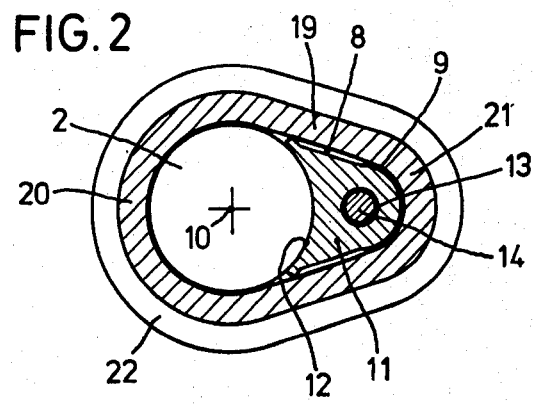
FIG. 2 is a cross section through the device of FIG. 1 along section II—II of FIG. 1.

In the embodiment shown in FIGS. 1 and 2, a recess or cavity 6 is provided in the holding element 5, the recess 6 opening downward and being aproximately cylindrical in shape, into which the gas spring 2, likewise cylindrical, can be inserted with a slight amount of play. A lengthwise adjustable gas spring of this type is disclosed in the German Auslegeschrift No. 1,812,282. Its use as a lengthwise-adjustable chair column is taught in detail in the German Auslegeschrift No. 1,931,012, and these disclosures are hereby incorporated by reference.

The upper edge of the gas spring 2 is located in the recess 6 against an axially acting stop collar 7 on the holding element 5, which in the sample embodiment shown in FIGS. 1 and 2 is formed by the bottom of the cup-shaped holding element 5 which in the position shown is located at the top.

A further recess 8 is provided in the holding element 5 extends radially from the circumference of the cylindrical recess or cavity 6. The recess 8 has a guide surface 9, located furthest out radially which is shown as rectilinear or — as in FIG. 2 — slightly curved, which is sloped such that its distance from the axis 10 of cylindrical recess 6, and hence from the gas spring 2, increases steadily downward. This guide surface 9 serves to position a gripping device 11 provided with a corresponding diagonal guide surface; the opposite surface of the gripping device 11 is given the form of a gripping surface 12 resting against the gas spring 2 and having a cross sectional shape complementary to that of the gas spring 2, i.e., in the shape of a section of a cylinder as shown in FIG. 2.

The gripping device 11 has a bore 13 which runs parallel to the axis 10; a threaded bolt 14 with head 15 resting against the underside of gripping device 11, for example in the shape of an external hexagon, is guided through this bore 13. The threaded bolt 14 has its thread 16 screwed into a corresponding thread 17 in the holding element 5. In the embodiment shown in FIGS. 1 and 2, the thread 17 is located in the abovementioned bottom of the cup-shaped holding element 5. In order to ensure that the gripping device 11 will be pulled downward, and thus loosened, when threaded bolt 14 is unscrewed, the gripping device 11 is fastened axially to the threaded bolt 14 by means of a retaining ring 18, with play. The diameter of bore 13 is larger than the diameter of the threaded bolt 14, so that gripping device 11 can be displaced slightly sideways due to guidance on guide surface 9, without resulting in a bending of the threaded bolt, as the threaded bolt 14 moves axially into the threaded opening 17.

After the holding element 5 is mounted on the upper end of the gas spring 2, the gripping device 11, with the threaded bolt 14, is inserted from below into the recess 8 and the threaded bolt 14 is screwed into the threaded opening 17 so that the gripping device 11 is forced upwardly by the head 15 acting on the bottom of the gripper 11. Due to the inclination of the guide surface 9, the gripper 11 becomes pressed or wedged radially with increasing force between the gas spring 2 and the inclined guide surface 9 thereby driving or wedging the gas spring 2 against the holding element 5 at the opposite side of the cylindrical recess 6. Since slope angle alpha, between the guide surface 9 and the axis 10, is very small (preferably 7°, and in a range of 5 to 15°), very large pressing and clamping forces result between the gripping device 11 and the gas spring 2, on the one hand, and the gas spring 2 and the corresponding part of holding element 5, on the other hand. Therefore, an axially precise position of gas spring 2 with respect to holding element 5 can be achieved, and together with a rigid but easily loosenable attachment of holding element 5 to gas spring 2, without deformation of the holding element 5 being necessary to install or replace a gas spring 2, which normally can lead to breakage of the holding element if the latter is made of die-cast or injection-molded metal.

If, as in the case of FIG. 2, the part of the wall 19 of holding element 5 which delimits recess 8 is merged tangentially into the wall part 20 which delimits cylindrical recess 6, and in this case the wall part 21 which delimits guide surface 9, no shearing or bending forces will develop in the wall part 19; there will only be tensile forces, so that this part of the wall can be made particularly thin, which is another way of simplifying manufacture and saving material in the holding element 5.

At the lower edge of the holding element 5, a circumferential reinforcing collar 21 is provided, which, as can be seen from the embodiments in FIGS. 1 and 2, is made in the form of a deep-drawn part for holding element 5, from which the necessary hold-down edges required for deep drawing can be made.

In the following description of further embodiments, to the extent that no basic differences exist, the sme reference numbers will be used as in the embodiments in FIGS. 1 and 2, so that a separate description can be omitted.

Figure 3:
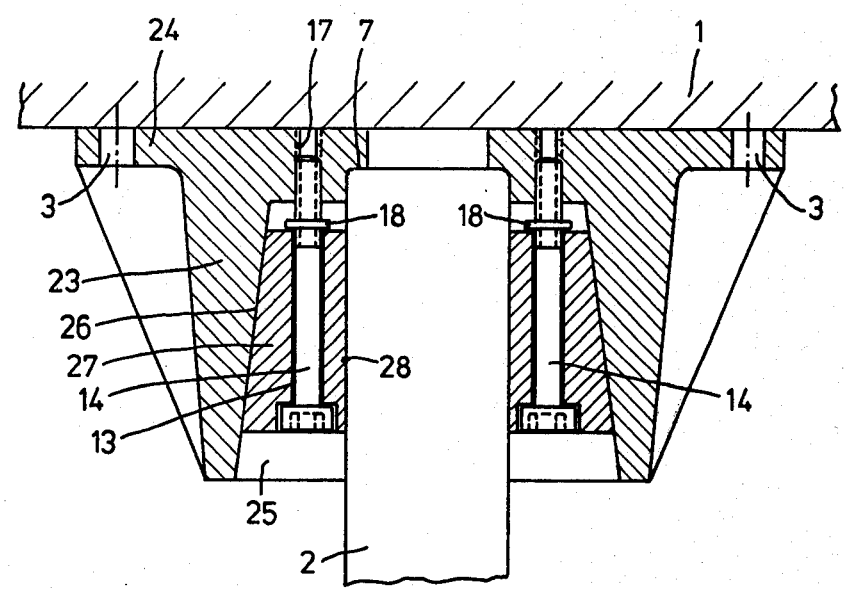
FIG. 3 is a further sample embodiment of a device according to the invention in a lengthwise cross section with a gripping device in the form of a truncated cone.
Figure 4:
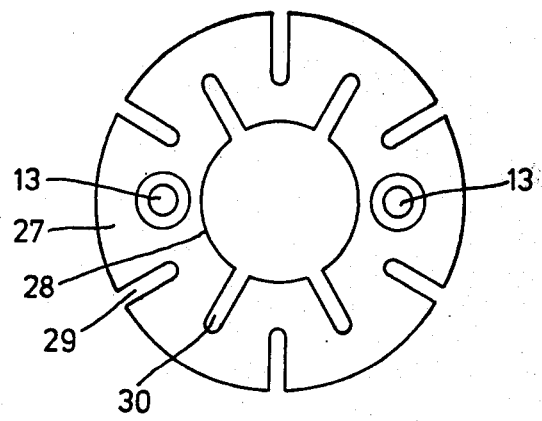
FIG. 4 is the gripping device according to FIG. 3, seen from below.

In the embodiment according to FIGS. 3 and 4, a holding element 23 and a flanged plate 24 are made in one piece of injection-molded metal. The holding element 23 has a recess 25 which expands downward and has the shape of a truncated cone; its truncated-cone-shaped wall 26 serves as a guide surface for a likewise truncated-cone-shaped annular gripping device 27 with the same slope angle on its outer surface, the annular gripper 27 having a concentric bore 28 passing therethrough to accept the gas spring 2. The gripping device 27 may be provided with a slot 29 which extends radially inward from the outside circumference and a slot 30 which extends radially outward from bore 28, these slots overlapping alternately radially so that the truncated-cone-shaped gripping device 27 can rest in the holding element 23 with a clamping action against the cylindrical shell of the gas spring 2 when the threaded bolt 14 is screwed into thread 17.

Figure 5:
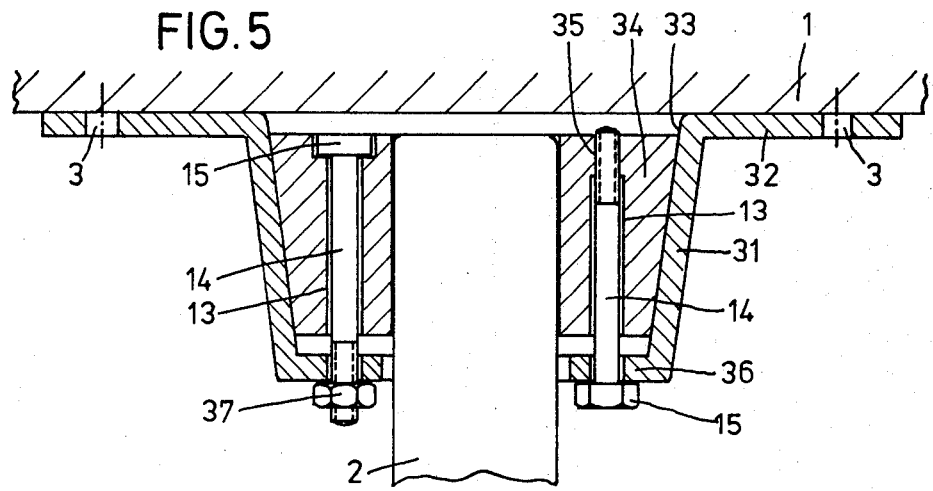
FIG. 5 is a further embodiment of the invention in a vertical lengthwise cross section.

In the embodiment according to FIG. 5, a holding element 31 and a flanged plate 32 are made in one piece as a deep-drawn part, but in contrast to the embodiment shown in FIGS. 3 and 4, the holding element 31 has a recess 33 which narrows downward and is open at the top and which is shaped like a truncated cone, into which a gripping device 34, which is theoretically of the same shape as that of FIG. 4, may be inserted; in contrast to the embodiment shown in FIGS. 3 and 4, however, the gripping device 34 is tightened downwardly to grip the gas spring 2. A thread 35 for the threaded bolt 14 can be provided in the corresponding bore 13 in the gripping device 34 (FIG. 5, right half). In this case, the head 15 of the threaded bolt 14 rests axially against a collar 36 on the holding element 31 which is drawn inwardly toward the bottom.

On the other hand, as an alternative (FIG. 5, left half), the gripping device 34 can be tightened by having a threaded bolt 14, with its head 15 located at the top, inserted from above through the bore 13 in the gripping device 34, the bolt 14 being screwed into a threaded receiver e.g. a nut 37, the nut 37 being, for example, axially connected with the collar 36.

Figure 6:
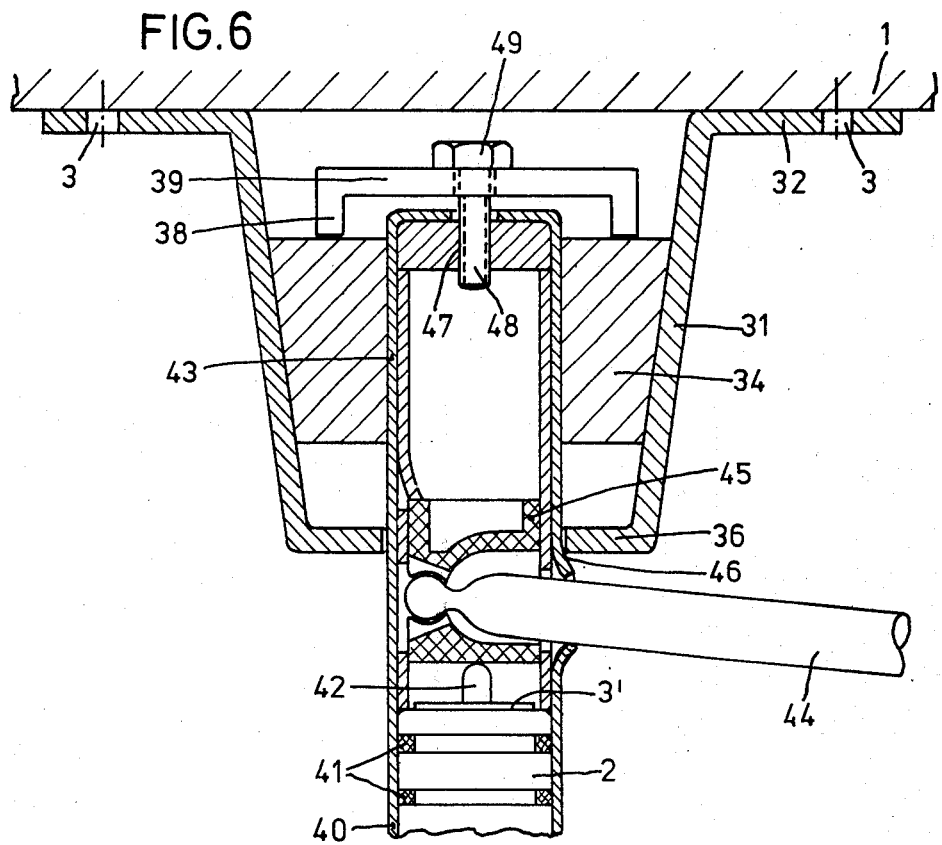
FIG. 6 is another embodiment of the invention in vertical lengthwise cross section.

In the embodiment shown in FIG. 6, the holding element 31 with plate 32 is the same as in the embodiment of FIG. 5. However, the tightening of gripping device 34 is used differently, namely, by means of a clamping plate 39 which rests on top of the gripper 34, with an annular collar 38 projecting against the top of the gripping device 34.

FIG. 6 also shows how the gas spring 2, preferably used in all sample embodiments, is formed in its upper part. It has a tubular cylindrical housing 40 whose internal space is sealed at the upper end by means of a sealing plug 3' made tight by seals 41. A valve stem 42 for a valve arrangement as disclosed by German Auslegeschrift No. 1,812,282 is displaceably mounted coaxially and projects upward out of this sealing plug 3'. The tubular housing 40 is elongated above the upper end of valve stem 42 by a similarly tubular extension 43 with the same outer diameter as the housing 40, this extension being held in the holding element 31. To operate the gas spring 2, an operating handle 44 is moved to drive an actuator 45, displaceably mounted in the tubular extension 43, axially against the valve stem 42. The operating lever 44 is swivelably supported in an outwardly bulging opening 46 in the extension 43.

In the embodiment of FIG. 6, there is provided concentrically in the vicinity of the upper end of extension 43, a thread 47 into which a threaded bolt 48, serving as a lock screw, can be screwed with its head 49 at the top, so that the gripping device 34 is pushed downwardly, by means of the clamping plate 39 with its annular collar 38, thus tensioning the gas spring 2. The lower collar 36 of the holder 31 then rests against the outward bulge 46 of the extension 43, whereby the gas spring 2 is held in place axially.

Figure 7:
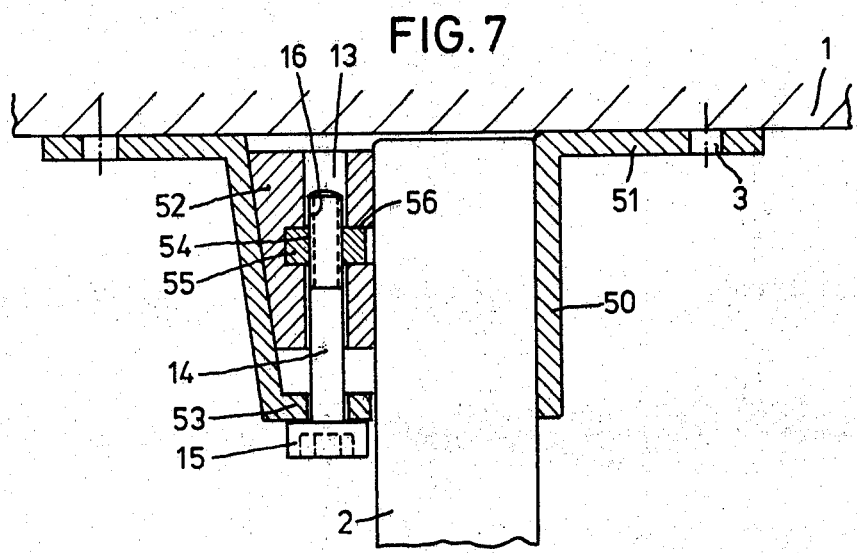
FIG. 7 is a further embodiment of the invention in vertical lengthwise cross section.

In the sample embodiment shown in FIG. 7, a holding element 50 and a plate 51 are again shown as a one-piece deep-drawn part in which a gripping device 52 is tightened downwardly. The threaded bolt 14 has its downwardly-located head 15 against a collar 53 which is drawn inwardly at the bottom of the holding element 50. The bore 13 provided in the gripping device 52, contains a thread 54 for mating with a thread 16 of the threaded bolt 14. The thread 54 may be on a nut 55 either cast in gripping device 52 or pushed laterally into a corresponding recess 56 so that in any case it comes to rest axially on gripping device 52.

Figure 8:
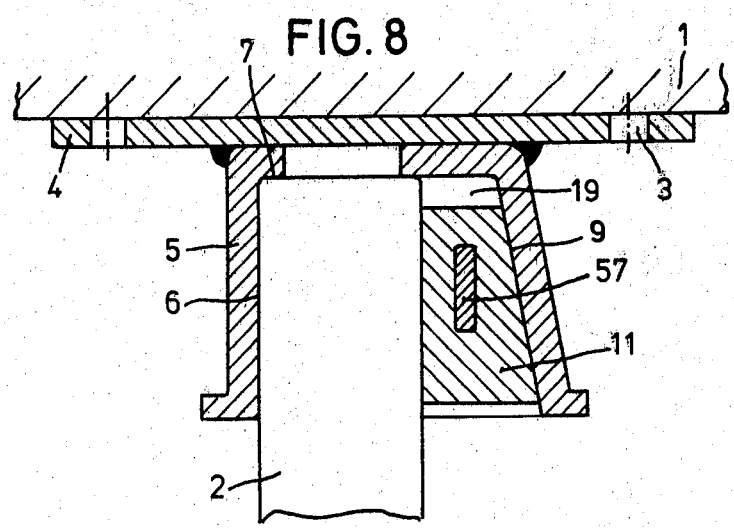
FIG. 8 is a further embodiment of the invention in vertical lengthwise cross section.

In the sample embodiment according to FIG. 8, which fundamentally corresponds to the sample embodiment of FIGS. 1 and 2, the fastening of gripping device 11 has been changed to the extent that it is not tightened by means of a threaded bolt, but instead by means of a conical wedge 57 which extends diagonally through it, the wedge 57 engaging corresponding openings in the wall 19 of holding element 5.

It will be obvious to those skilled in the art that various changes may be made without departing from the scope of the invention and the invention is not to be considered limited to what is shown in the drawings and described in the specification.

What is claimed is:

1. In a device for the releasable fastening of a lengthwise adjustable gas spring column, formed of one piece at its upper end, to a seat bottom of an article of seating furniture, with a holding device fastened to the underside of the seat bottom, said holding device being provided with a recess to accept the upper end of the gas spring column, and a gripping device for holding the column in the recess by clamping action, the improvement wherein:

said device for holding the gas spring column is of a generally inverted cup-shape, the bottom of the cup-shaped holding device being fastened to the seat bottom underside with the sides of the cup projecting downwardly over the upper end of the column, the cup-shaped holding device containing two recesses, said gripping device being mounted in a first of said two recesses of said holding device which connects radially with the second of said recesses of said holding device, which second recess accepts the column, said holding device comprising an internal wall which laterally delimits said first recess for said gripping device and which makes a tangential transition to said second recess for the column, said first recess comprising a slightly inclined guide surface;

said gripping device comprises at least one gripping surface which is in the shape of a section of a cylinder and a slightly inclined guide surface opposite said gripping surface and resting on said slightly inclined guide surface of the first recess of said holding device, both said guide surfaces being slightly inclined with respect to the axis of the gas spring column; and means to displace said gripping device axially to wedge the gas spring column in the second recess of the holding device, said displacing means comprising a tensioning device to force said gripping element in an axial direction, said tensioning device comprising at least one threaded bolt having a head which bolt passes through an unthreaded opening in said gripping device and fits into a thread in the bottom of said holding device, the head of said bolt abutting said gripping device, and means on said threaded bolt to protect said bolt against displacement relative to said gripping device.

2. A device according to claim 1, wherein said means on said bolt comprises a retaining ring on said threaded bolt to protect said bolt against displacement.

3. A device according to claim 1, wherein said holding device comprises an axially fixed stop collar to immobilize the column axially.

4. A device according to claim 1 wherein said holding element is a deep-drawn part.

5. A device according to claim 1 wherein said holding device is unitary with a seat plate fastenable to a seat bottom.

* * * * *